United States Patent
Choe

(10) Patent No.: US 8,597,082 B2
(45) Date of Patent: Dec. 3, 2013

(54) GRINDING APPARATUS AND METHOD FOR FABRICATION OF LIQUID CRYSTAL DISPLAY DEVICE

(75) Inventor: Byeong Gwon Choe, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 883 days.

(21) Appl. No.: 12/629,392

(22) Filed: Dec. 2, 2009

(65) Prior Publication Data

US 2010/0304643 A1   Dec. 2, 2010

(30) Foreign Application Priority Data

Dec. 19, 2008 (KR) .................. 10-2008-0130014

(51) Int. Cl.
*B24B 7/02* (2006.01)
(52) U.S. Cl.
USPC ............. 451/67; 451/130; 451/194; 451/285; 349/187
(58) Field of Classification Search
USPC ......... 451/130, 132, 133, 134, 194, 195, 262, 451/285, 289; 349/187
See application file for complete search history.

(56) References Cited

U.S. PATENT DOCUMENTS

| | | | |
|---|---|---|---|
| 7,637,799 B2 * | 12/2009 | Lee | 451/11 |
| 2003/0223030 A1 * | 12/2003 | Byun et al. | 349/187 |
| 2004/0001177 A1 * | 1/2004 | Byun et al. | 349/187 |
| 2004/0171269 A1 * | 9/2004 | Kondo et al. | 438/694 |
| 2004/0259475 A1 * | 12/2004 | Vianello et al. | 451/5 |
| 2005/0064703 A1 * | 3/2005 | Kondo et al. | 438/633 |
| 2005/0122463 A1 * | 6/2005 | Byun et al. | 349/187 |
| 2005/0248715 A1 * | 11/2005 | Byun et al. | 349/187 |
| 2008/0170197 A1 * | 7/2008 | Byun et al. | 349/189 |

FOREIGN PATENT DOCUMENTS

KR    1020060068997 A    6/2006

OTHER PUBLICATIONS

Korean Patent Office Action dated Feb. 21, 2013.

* cited by examiner

*Primary Examiner* — Maurina Rachuba
(74) *Attorney, Agent, or Firm* — Morgan, Lewis & Bockius LLP

(57) ABSTRACT

There is disclosed a grinding apparatus for fabrication of a liquid crystal display device that is adaptive for improving the adsorption defect of a substrate onto a substrate stage. A grinding apparatus for fabrication of a liquid crystal display device disclosed in the present invention includes a plurality of substrate stage configured to make a linearly bi-directional movement; first and second grinding parts disposed in a series at an area to which the substrate stage moves; first to third aligning parts disposed at both ends of the first and second grinding parts and therebetween; and first and second cleaning parts disposed between the first and second grinding parts and the first and second aligning parts so as to clean the substrate stage.

4 Claims, 5 Drawing Sheets

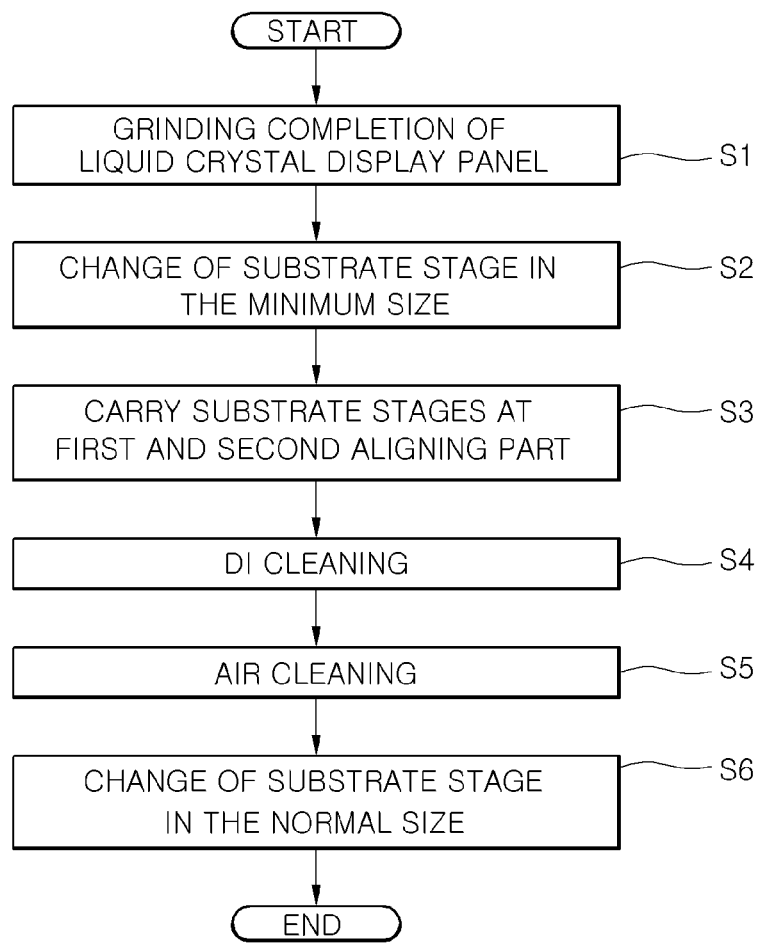

ing the liquid crystal display panel through the first and second grinding parts; performing the aligning process for the first and second substrate stages at the first and second aligning parts; cleaning the first and second substrate stages through the first and second cleaning parts; aligning the first and second substrate stages that went through the cleaning process at the third aligning part; and loading the liquid crystal display panel at the first and second substrate stages that went through the aligning process.

US 8,597,082 B2

GRINDING APPARATUS AND METHOD FOR FABRICATION OF LIQUID CRYSTAL DISPLAY DEVICE

CROSS-REFERENCE TO RELATED APPLICATION

This application claims priority under 35 U.S.C. 119 to Korean Patent Application No. 10-2008-0130014, filed on Dec. 19, 2008, which is hereby incorporated by reference in its entirety.

BACKGROUND

1. Field of the Disclosure

This disclosure relates to a grinding apparatus and an adaptive method for the fabrication of a liquid crystal display device that is able to improve an adsorption defect of a substrate onto a substrate stage.

2. Description of the Related Art

Recently, various flat display devices of reduced weight and bulk, unlike cathode ray tubes, are becoming popular. Such flat display devices include liquid crystal display devices, field emission displays, plasma display panels and organic electro luminescence display devices.

Flat panel display devices like these are included in image display devices such as televisions and computer monitors, and play the role of displaying various images and characters as well as motion pictures.

Among these flat panel display devices, liquid crystal display devices are used in many applied fields because of it is desirable to make electronic appliances light, thin, short and small and because their mass productivity has improved.

In particular, an active matrix type liquid crystal display device that drives liquid crystal cells by use of thin film transistors has the advantages of an excellent picture quality and low power consumption. In addition, these devices are rapidly being developed to be larger and to have high resolution. This is the result of research and development and due to recent mass production technology.

The fabrication of a liquid crystal display device involves various processes: a process of fabricating a thin film transistor substrate whereby the thin film transistor is formed by pixels to be a switching device; a process of fabricating a color filter substrate that faces the thin film transistor substrate and in which a common electrode and red, green and blue color filters are formed in correspondence to each pixel; and a cell process of bonding two substrates together after interposing liquid crystal between the thin film transistor substrate and the color filter substrate that were fabricated by the above two processes. A liquid crystal display panel is completed by the cell process and the liquid crystal display device is completed by adhering a polarizing plate, a drive circuit substrate and a backlight unit to the liquid crystal display panel.

The cell process that completes the liquid crystal display panel by bonding the thin film transistor and the color filter substrate together will now be briefly explained.

The cell process can be divided into an alignment process, a cell gap forming process, a cell cutting process, a liquid crystal injection process, and a grinding process. During the alignment process, the liquid crystal is aligned in one direction in the thin film transistor substrate where the thin film transistors are arranged and in the color filter substrate where the color filter is formed. During the cell gap forming process, the two substrates which went through the alignment process are bonded together with a fixed gap maintained. In the cell cutting process, a circular plate panel bonded by the cell gap forming process is cut into unit panels. During the liquid crystal injection process, liquid crystal is injected into the inside of each unit panel. In the grinding process the cut surface is ground.

The grinding process involves grinding a cut edge of the liquid crystal display panel after the liquid crystal is injected. This is to prevent an operator from being injured by a sharp cut surface. It also prevents a signal input pattern and a printed circuit board from being misaligned, and a crack from forming by a process impact when drive IC's and a printed circuit board for applying drive signals to data lines and gate lines formed on the thin film transistor substrate and a signal input pattern for inputting drive signals are adhered to the upper surface of the side of an array substrate by use of ACF (anisotropic conductive film) bonding or soldering.

FIG. 1 is a planar view illustrating a substrate stage that supports a liquid crystal display panel in a grinding apparatus for the fabrication of a general liquid crystal display device.

The grinding apparatus for the fabrication of the liquid crystal display device includes a substrate stage 20 that adsorbs and fixes the liquid crystal display panel to be ground.

The substrate stage 20 includes a plurality of vacuum adsorption holes 21 for adsorbing the liquid crystal display panel.

The vacuum adsorption hole 21 plays the role of fixing the liquid crystal display panel to the substrate stage 20 by use of vacuum adsorption.

However, the grinding apparatus for the fabrication of the general liquid crystal display device has a problem: impurities such as glass powder generated by grinding the edge of the liquid crystal display panel are piled up in the vacuum adsorption hole 21 and can clog the adsorption hole 21 so as to generate a substrate adsorption defect during the process.

BRIEF SUMMARY

Accordingly, the present embodiments are directed to grinding apparatus and method for the fabrication of an LCD device that substantially obviate one or more of problems due to the limitations and disadvantages of the related art, and a driving method thereof.

An object of the present embodiment is to provide a grinding apparatus and an adaptive method for the fabrication of a liquid crystal display device that is able to improve the adsorption defect of a substrate onto a substrate stage.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a grinding apparatus for fabrication of a liquid crystal display device includes a plurality of substrate stage configured to make a linearly bi-directional movement; first and second grinding parts disposed in a series at an area to which the substrate stage moves; first to third aligning parts disposed at both ends of the first and second grinding parts and therebetween; and first and second cleaning parts disposed between the first and second grinding parts and the first and second aligning parts so as to clean the substrate stage.

A method of grinding a liquid crystal display device according to another aspect of the present embodiment includes moving first and second substrate stages to first and second aligning parts after performing the grinding process of the liquid crystal display panel as many times as pre-set; minimizing the size of the first and second substrate stages; cleaning the first and second substrate stages for the first time by using pure water DI; cleaning the first and second substrate stages by using air pressure; and carrying out the grinding process after changing the sizes of the first and second substrate stages, of which the cleaning is completed, to the size thereof when grinding.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings:

FIG. 5 is a flow chart illustrating a method of grinding a liquid crystal display device according to an embodiment of the present invention.

DETAILED DESCRIPTION

Figure 1:
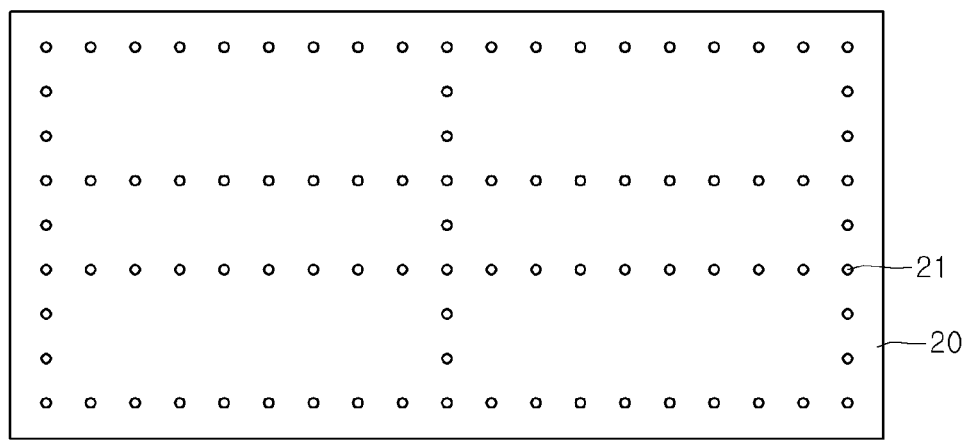
FIG. 1 is a planar view illustrating a substrate stage that supports a substrate in a grinding apparatus for the fabrication of a general liquid crystal display device.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
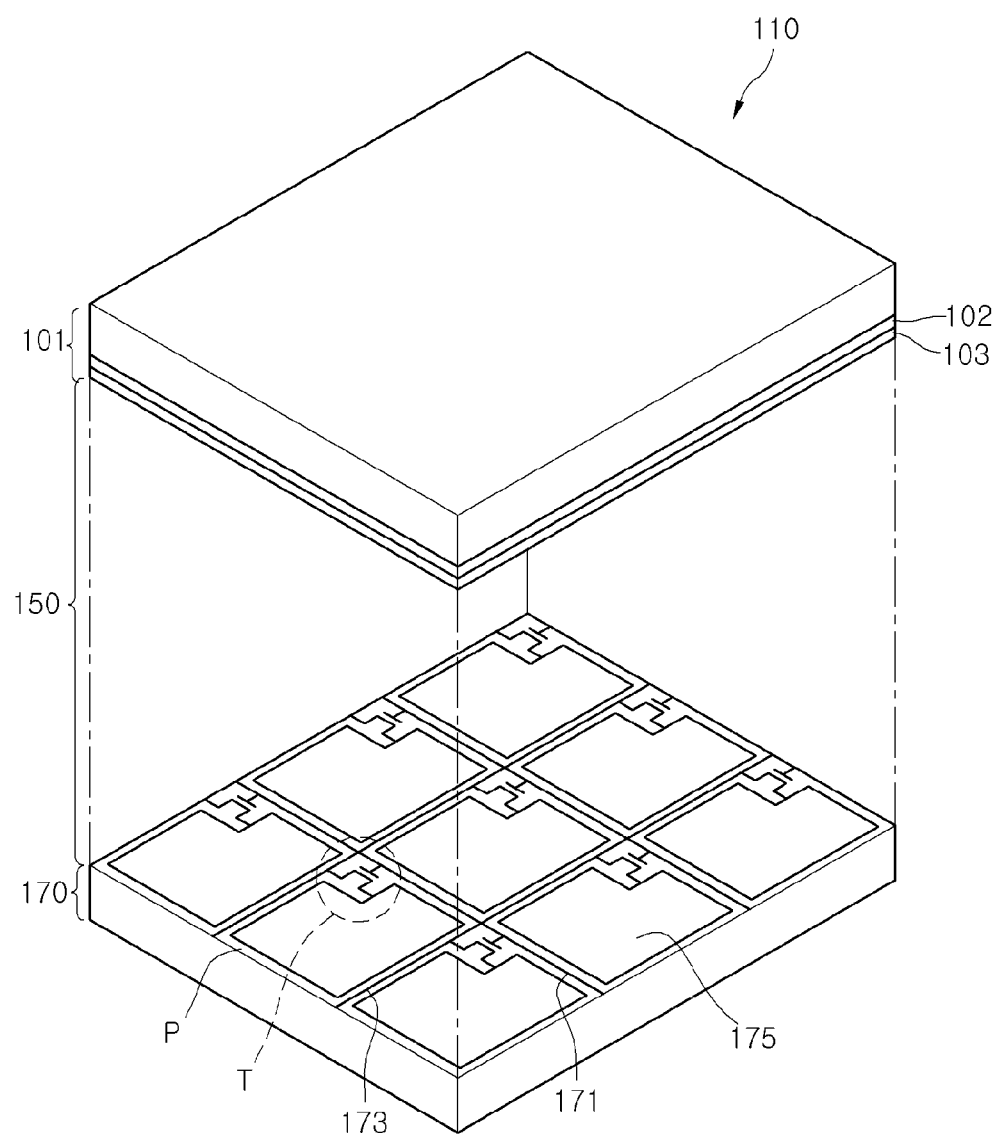
FIG. 2 is a view illustrating an area of a liquid crystal display device.
Figure 3:
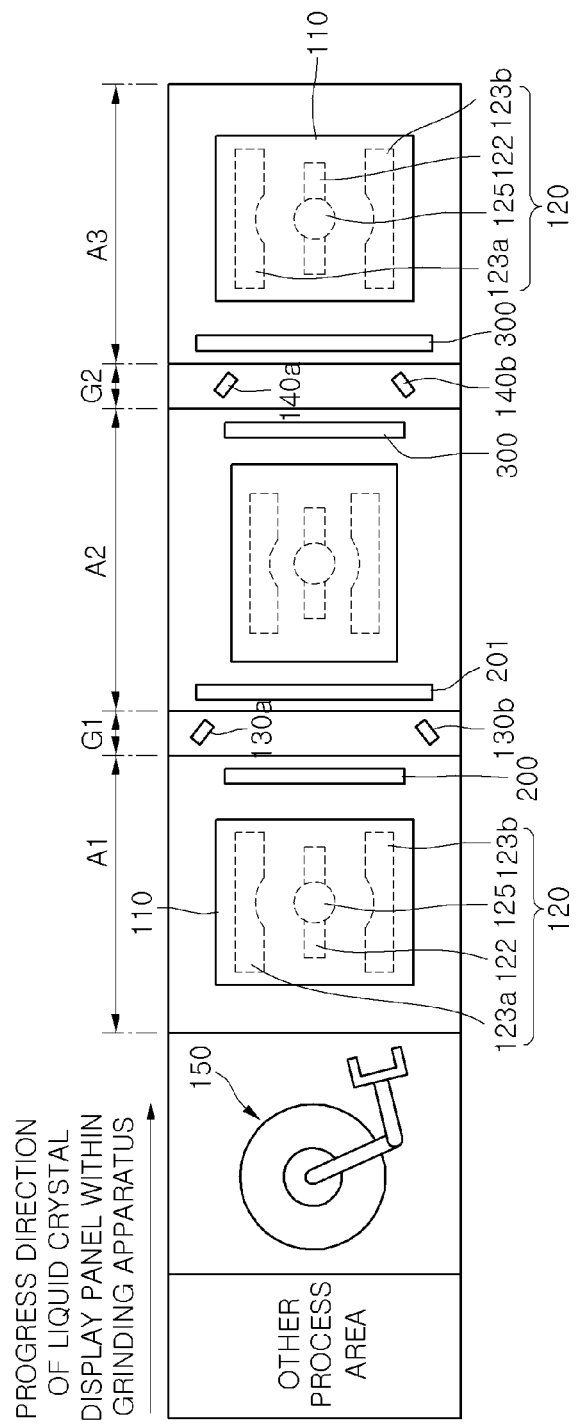
FIG. 3 is a planar view briefly illustrating a grinding apparatus for the fabrication of a liquid crystal display device according to an embodiment of the present disclosure.
Figure 4:
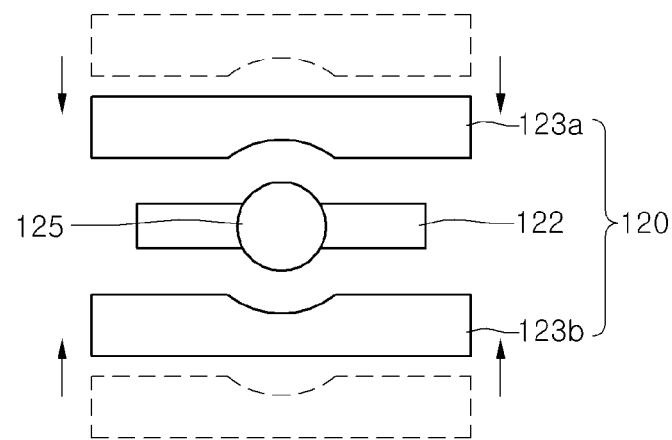
FIG. 4 is a planar view illustrating a substrate stage included within the grinding apparatus for the fabrication of the liquid crystal display device of the present disclosure.

FIG. 2 is a view illustrating an area of a liquid crystal display panel, FIG. 3 is a planar view briefly illustrating a grinding apparatus for the fabrication of a liquid crystal display device according to an embodiment of the present disclosure, and FIG. 4 is a planar view illustrating a substrate stage included within the grinding apparatus for the fabrication of the liquid crystal display device of the present disclosure.

As shown in FIG. 2, a liquid crystal display panel 110 includes upper and lower substrates 101, 170 that face each other with a fixed gap between them, and a liquid crystal layer 150 interposed between the upper and lower substrates 101, 170.

A plurality of gate lines 171 and a plurality of data lines 173 are arranged to cross each other on the upper surface of the lower substrate 170, and a thin film transistor T is formed at an area where the gate line 171 crosses the data line 173.

Furthermore, a pixel P is defined by the crossing of the gate line 171 and the data line 173 in the lower substrate 170, and a pixel electrode 175 connected to the thin film transistor T is formed in the pixel P.

The liquid crystal display panel with such a structure is completed by cutting the circular plate panel where the upper and lower substrates 101 and 170 are bonded together into unit panels and injecting liquid crystal into the inside.

A grinding process is carried out on the side surface of the completed liquid crystal display panel 110.

Referring to FIGS. 3 to 5, the grinding apparatus for the fabrication of the liquid crystal display device will be explained in more detail.

As shown in FIG. 3, the grinding apparatus for fabrication of the liquid crystal display device according to an embodiment of the present invention is configured to be a linear type so that the liquid crystal display panel 110 can be directly connected to a conveyor which becomes a main moving route.

The grinding apparatus includes a robot 150 for moving the liquid crystal display panel 110 to the grinding apparatus, a first grinding part G1 for grinding a long side surface of the liquid crystal display panel 110, a second grinding part G2 for grinding its short side surface, and a substrate stage 120 that travels linearly between the first and second grinding parts G1, G2. First and second aligning parts A1, A2 are configured after the first and second grinding parts G1, G2 for aligning the liquid crystal display panel 110 located at the upper surface of the substrate stage 120, and a third aligning part A3 is configured after the second grinding part G2.

The substrate stage 120 includes first and second supporting parts 123a, 123b that support the lower surface edge of the liquid crystal display panel 110, and a third supporting part 122 that supports the central area of the lower surface of the liquid crystal display panel 110 and that has a rotating part 125 which can rotate the liquid crystal display panel 110 at the same time.

Though not shown in detail in the drawing, an adsorption hole for fixing the liquid crystal display panel 110 is configured on the upper surface of the rotating part 125.

That is to say, the substrate stage 120 adsorbs one surface of the liquid crystal display panel 110 transferred from the robot 150 with a vacuum by use of the adsorption hole. This is to fix the liquid crystal display panel 110 onto the substrate stage 110. At this moment, before the vacuum adsorption is carried out, in the first aligning part A1, the long axis direction of the liquid crystal display panel 110 is aligned to be parallel to the direction in which the grinding process is carried out.

In the first grinding part G1, first and second grinding stones 130a, 130b that rotate at a high speed to grind the long side surface of the liquid crystal display panel 110 are disposed to be separated from each other at a fixed distance.

In the first grinding part G1, the long side surface of the liquid crystal display panel 110 is ground by the first and second grinding stones 130a, 130b that rotate at a high speed as the substrate stage 120 moves in slowly.

Then, if the substrate stage 120 moves to the end of the first grinding part G1, the liquid crystal display panel 110 is rotated at an angle of 90 degree in the second aligning part A2.

In the second grinding part G2, third and fourth grinding stones 140a and 140b that rotate at a high speed to grind the short side surface of the liquid crystal display panel 110 are disposed to be separated from each other at a fixed distance In the second grinding part G2, the short side surface of the liquid crystal display panel 110 is ground by the third and fourth grinding stones 140a and 140b that rotate at a high speed as the liquid crystal display panel 110 rotated at an angle of 90 degree in the second aligning part A2 moves in slowly.

The substrate stage 120 that passes through the second grinding part G2 rotates at the angle of 90 degree in the third aligning part A3 to align the liquid crystal display panel 110, thereby completing the grinding process.

In this process, the grinding apparatus for fabrication of the liquid crystal display device according to the embodiment of the present disclosure includes a cleaning part for improving the adsorption defect of the liquid crystal display panel 110 which is caused by a clog made by the impurities generated at the adsorption hole of the substrate stage 120 during the grinding process.

A first DI cleaning part 200 that cleans the substrate stage 120 by use of pure water DI is disposed before the first grinding part G1.

Furthermore, a second DI cleaning part 300 is disposed before the second grinding part G2.

The substrate stage 120 located at the first aligning part A1 slowly passes through the first DI cleaning part 200 for the first cleaning before the substrate stage 120 is loaded with the liquid crystal display panel 110. At this moment, the substrate 120 located at the second aligning part A2 slowly passes through the second DI cleaning part 300 for the first cleaning before the substrate stage 120 is loaded with the liquid crystal display panel 110.

First and second air cleaning parts 210 and 301 are respectively disposed after the first and second grinding parts G1, G2.

The substrate stages 120 cleaned for the first time by the first and second DI cleaning parts 200 and 300 are cleaned for the second time by the air spray of the first and second cleaning parts 201 and 301.

The grinding apparatus explained above can prevent the adsorption defect of the liquid crystal display panel 110 since the impurities generated in the grinding process are removed by the cleaning at the first and second air cleaning parts 201, 301.

Herein, the substrate stage 120 has the first and second supporting parts 123a and 123b moved in a third supporting part 122 direction as far as possible before the cleaning process starts in case that the first and second supporting parts 123A and 123B are expanded in a side direction. The size of the substrate stage 120 is minimized by moving the first and second supporting parts 123a and 123b in the third supporting part 122 direction because it is easier to correspond to the spatial restriction within the grinding apparatus.

This description limits the first and second DI cleaning parts 200 and 300 and the first and second air cleaning parts 201 and 301 to be located before and after the first and second grinding parts G1 and G2, but they can also be disposed at any place within the grinding apparatus without restriction.

The grinding apparatus according to the embodiment of the present disclosure described above cleans the substrate stage 120 with a fixed gap, making it possible to prevent the adsorption defect of the liquid crystal display panel 110. Herein, the cleaning interval of the substrate stage 120 can be changed. That is to say, the cleaning process of the grinding apparatus of the present disclosure might occur when the adsorption defect of the liquid crystal display panel 110 is generated. For example, in the grinding apparatus of the present disclosure, the cleaning of the substrate stage 120 might be carried out once after one hundred times of the grinding process, or the cleaning of the substrate stage 120 might be carried out once after twenty times of the grinding process.

FIG. 5 is a flow chart illustrating a method of grinding a liquid crystal display device according to an embodiment of the present invention.

As shown in FIG. 5, the method of grinding the liquid crystal display device according to the embodiment of the present invention is carried out after the grinding process of the liquid crystal display panel is completed as many times as pre-set. (S1)

Herein, the grinding process is carried out as many times as pre-set. (for example, 100 times, 200 times and so on)

The substrate stage can be extended in the outer direction in accordance with the size of the liquid crystal display panel, and is changed to the minimum size while the cleaning process is carried out. (S2)

The substrate stage located at the second aligning part is moved to the first aligning part and the substrate stage located at the third aligning part is moved to the second aligning part. (S3)

As the substrate stages moved to the first and second aligning parts are made to move to the first and second DI cleaning parts, the first cleaning is carried out. (S4)

After the first cleaning is carried out, the second cleaning is carried out by the first and second air cleaning parts. (S35)

The substrate stages of which the second cleaning is completed are made to move to the first and second aligning parts respectively. The first and second supporting parts for grinding the liquid crystal display panel are made to move in the outer direction so as to change the size in accordance with the size of the corresponding liquid crystal display panel in order to carry out the grinding process. (S6)

The grinding apparatus for the fabrication of the liquid crystal display device according to the embodiment of the present disclosure described above includes the cleaning part for removing the impurities generated by the grinding process, thus it is possible to prevent the adsorption defect of the liquid crystal display panel. Accordingly, the lighting test device for fabrication of the liquid crystal display device of the present disclosure can prevent the adsorption defect of the liquid crystal display panel and in turn can reduce the process time and cost loss generated by the adsorption defect of the liquid crystal display panel during the grinding process.

Furthermore, the present disclosure automatically cleans the substrate stage, thus it is possible to prevent the risk in safety which might be caused by the conventional cleaning operation of an operator.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A grinding apparatus for fabrication of a liquid crystal display device comprising:

a plurality of substrate stage configured to make a linearly bi-directional movement;

first and second grinding parts disposed in a series at an area to which the substrate stage moves;

first to third aligning parts disposed in a series at an area to which the substrate stage moves;

first cleaning parts are respectively disposed before the first grinding part and the second grinding part; and second cleaning parts are respectively disposed after the first grinding part and the second grinding part, wherein the first grinding part is disposed between the first aligning part and the second aligning part, wherein the second grinding part is disposed between the second aligning part and the third aligning part.

2. The grinding apparatus according to claim 1, wherein the first cleaning parts consist of a DI cleaning part configured to clean for the first time by use of pure water DI;

wherein the second cleaning parts consist of an air cleaning part configured to clean for the second time by use of the pressure of air.

3. The grinding apparatus according to claim 1, wherein the substrate stage includes:

first and second supporting parts configured to support the lower surface edge of a liquid crystal display panel; and a third supporting part configured to support the lower surface center area of the liquid crystal display panel and to have a rotation part that might rotate the liquid crystal display panel at the same time.

4. The grinding apparatus according to claim 3,

Wherein the first and second supporting parts respectively move in the direction of the third supporting part while the rotation part rotates the liquid crystal display panel entering into the first cleaning parts.

* * * * *